2,886,988

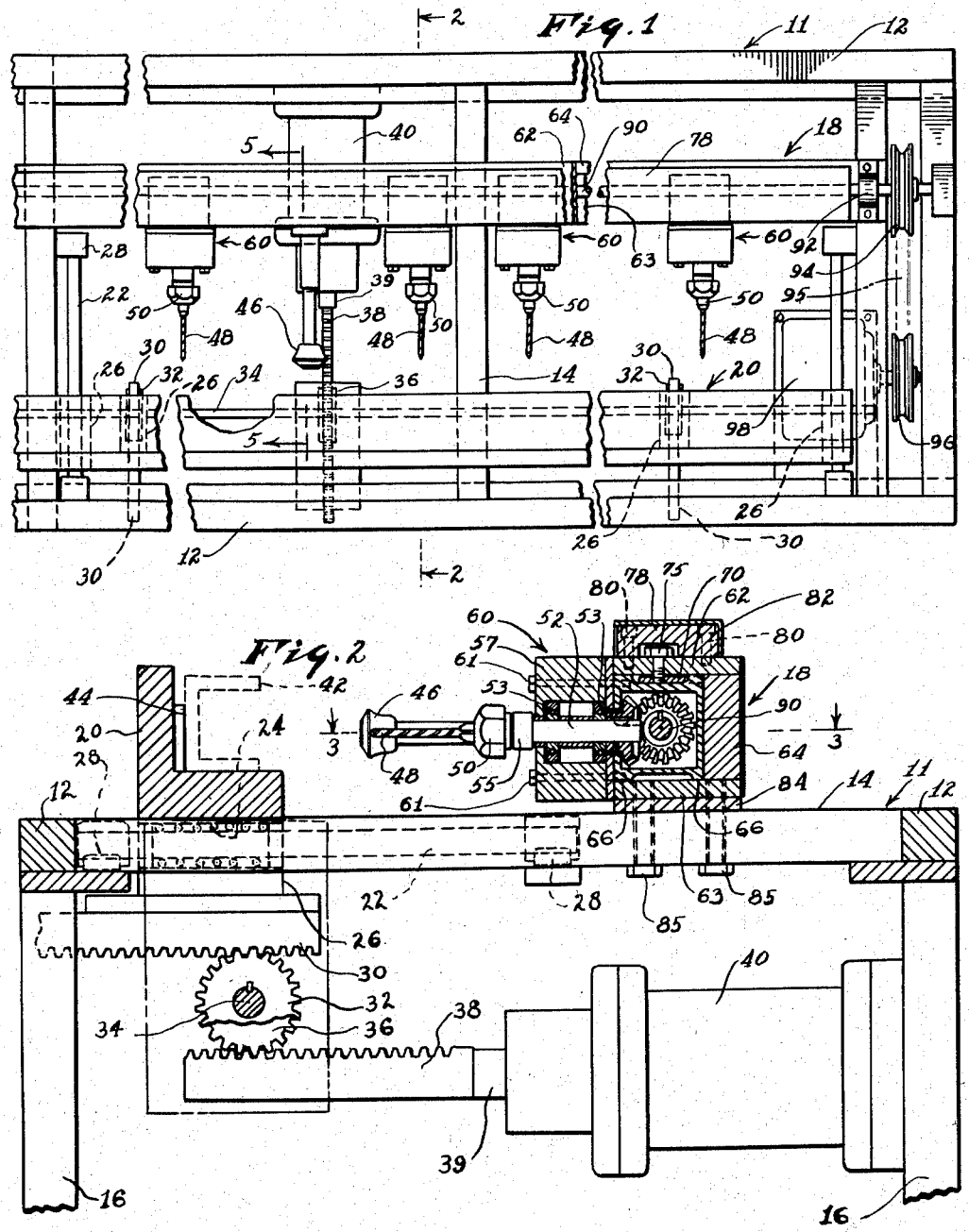
May 19, 1959 — S. E. GORDON — 2,886,988
MULTI-SPINDLE DRILLING MACHINE WITH INDIVIDUAL ADJUSTMENT ALONG A COMMON DRIVE SHAFT
Filed July 15, 1954 — 2 Sheets-Sheet 1
INVENTOR.
Seymour E. Gordon
BY Emery, Varney, Whittemore & Dix
ATTORNEYS May 19, 1959 S. E. GORDON 2,886,988
MULTI-SPINDLE DRILLING MACHINE WITH INDIVIDUAL
ADJUSTMENT ALONG A COMMON DRIVE SHAFT
Filed July 15, 1954 2 Sheets-Sheet 2
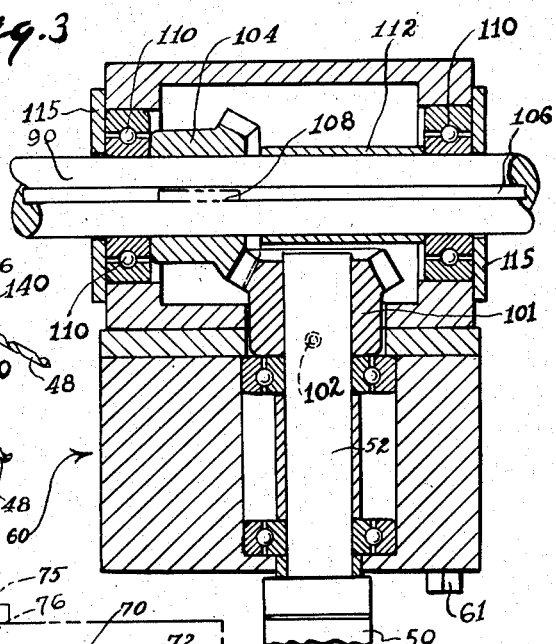
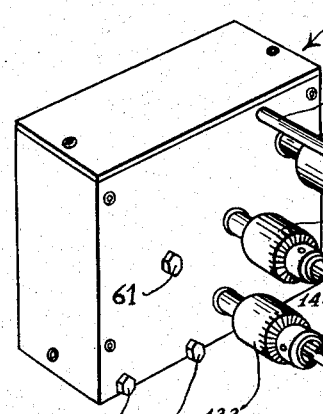
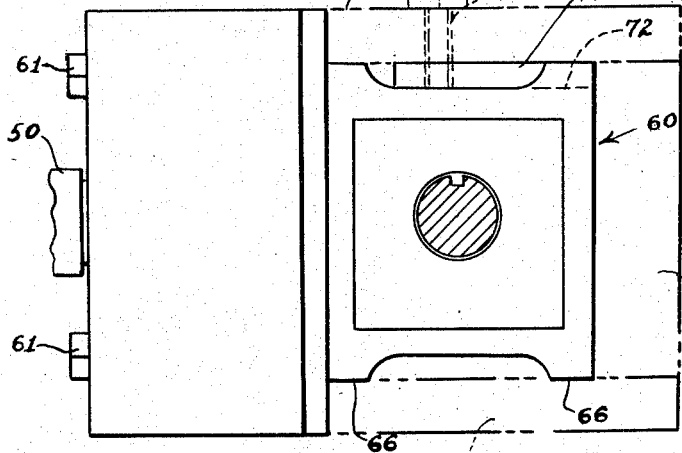
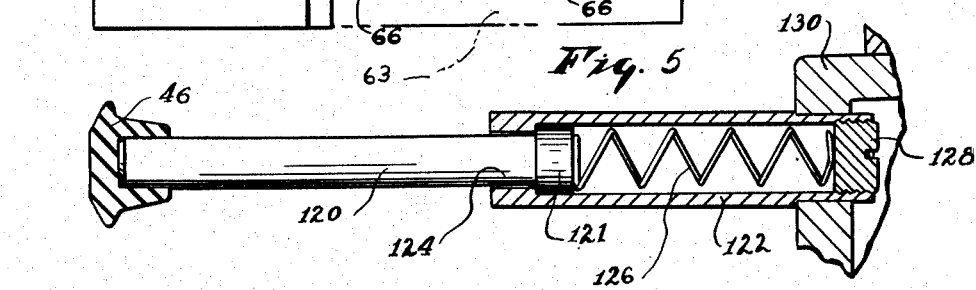
INVENTOR.
Seymour E. Gordon
BY Emery, Varney,
Whittemore & Dix.
ATTORNEYS United States Patent Office 2,886,988
Patented May 19, 1959

MULTI-SPINDLE DRILLING MACHINE WITH INDIVIDUAL ADJUSTMENT ALONG A COMMON DRIVE SHAFT

Seymour E. Gordon, Rockville Centre, N.Y.

Application July 15, 1954, Serial No. 443,583

5 Claims. (Cl. 77—22)

This invention relates to gang drilling machines, and more especially to drilling machines in which the drills extend horizontally and the work is brought against the drills by relative horizontal movement of the work with respect to the chucks in which the drills are held.

It is an object of this invention to provide an improved gang drilling machine in which a plurality of independently movable carriages support separate drill chucks or groups of drill chucks, and the carriages are movable along a common drive shaft without having to disconnect operating mechanism through which motion is transmitted from the drive shaft to the chucks in the respective carriages.

One feature of the invention relates to the construction of the guide means along which the carriages are movable and to means for clamping the carriages in any adjusted positions, another feature relates to the construction of the carriages and to the motion transmitting connections by which their drill chucks are operated.

Another object of the invention is to provide a simplified gang drilling machine in which drill operating carriages can be shifted into different positions lengthwise of the machine and a work table is movable toward and from the drilling mechanism by a motor operating through connections which move the work table always parallel to itself as it travels toward and from the drilling mechanism.

Other objects, features and advantages of the invention will appear or be pointed out as the description proceeds.

In the drawing, forming a part hereof, in which like reference characters indicate corresponding parts in all the views:

Figure 1 is a top plan view, partly broken away, showing a gang drilling machine embodying this invention;

Figure 2 is a greatly enlarged sectional view taken on the line 2—2 of Figure 1;

Figure 3 is greatly enlarged sectional view taken on the line 3—3 of Figure 2;

Figure 4 is a side elevation of the carriage shown in Figure 3;

Figure 5 is a greatly enlarged vertical, sectional view on the line 5—5 of Figure 1; and Figure 6 is a perspective view of a modified construction of the front end of the carriage shown in Figs. 1-4.

The gang drilling machine shown in Figure 1 includes a main frame 11 which has longitudinally extending frame members 12 running for the full length of the machine, and transversely extending frame members 14 at spaced stations along the length of the main frame. At opposite ends of each of the transversely extending frame members 14, there are legs 16 (Figure 2) for supporting the machine from a floor, foundation, or other underlying support.

A guideway comprising a channel 18 extends lengthwise of the main frame 11, and this channel 18 is secured to the transversely extending members 14 so that it is in a fixed position on the main frame 11. A work supporting table 20 is also carried by the main frame 11 and it is movable toward and from the channel 18 along bearing surfaces provided by the transversely extending frame members 14.

In order to guide the work table 20 and to prevent longitudinal displacement of the work table, there are guide rods 22 connected to at least some of the transversely extending frame members 14. Each of these guide rods 22 extends through a bearing 24 in a downwardly extending bracket 26 which projects below the work supporting table 20. In the preferred construction, the bearings 24 are ball bearings. The guide rods 22 are connected to the main frame by brackets 28.

There are other brackets 26 extending downwardly from the table 20; and at the lower end of each of the brackets 26, there is a rack 30 which meshes with a pinion 32 secured to a shaft 34. This shaft 34 extends lengthwise of the machine so that the motion imparted to all of the racks 30 is from the same shaft 34. This insures that all of the racks 30 will move simultaneously and by equal amounts for maintaining the work table 20 always parallel to itself as it moves toward and from the guideway channel 18. At a location which is preferably near the middle of the shaft 34 there is another pinion 36, of the same diameter as the pinions 32, which meshes with a driving rack 38 connected to a piston rod 39 of a cylinder and piston motor 40 secured to the main frame.

Reciprocating movement of the piston rod 39 imparts rotation to the shaft 34 and through the shaft transmits motion to the various racks 30 which move simultaneously with and by exactly the same amount as the piston rod 39. If a mechanical advantage gaining speed or force is desirable, between the motor 40 and the work support 20, then different diameter pinions can be used in place of the pinions 32 and 36.

A work piece 42, shown in phantom in Figure 2, is spaced from the back of the work table 20 by spacer blocks 44 so as to provide for full penetration of drills through the work piece without marring the surface of the back of the work table. When the work table 20 is advanced toward the channel 18, and before it has moved into contact with the drills, the work piece 20 is pressed firmly against the spacer blocks 44 by a presser foot 46 having a spring behind it which yields as the work support 20 is advanced further toward the channel 18 to bring the work into contact with drills 48. These drills are located at all points where holes are to be drilled into the work piece 42.

Each of the drills 48 is held in a chuck 50 at the forward end of a spindle or drive shaft 52 which rotates in ball bearings 53. A thrust bearing 55, behind the chuck 50, bears against a bushing at the front of a carriage head 57 which forms an integral part of a carriage 60 from which the drill chuck 50 is supported. The carriage head 57 is detachably connected to the rearward portion of the carriage 60 by screws 61 or other fastening means.

The channel 18 has a top wall 62, a bottom wall 63 and one side wall 64. The open side of the channel 18 faces toward the work table 20. The rearward portion of the carriage 60 extends into the channel 18 whereas the carriage head 57, which forms the forward part of the carriage 60, bears against the edge faces of the top wall 62 and the bottom wall 63 of the channel.

The carriage 60 has bottom bearing surfaces 66 which rest on the bottom wall 63 of the channel 18. At the upper end of the carriage 60 there is a clamping element 70 best shown in Figure 4. This clamping element 70 is connected to the carriage 60 at its rearward end at the location indicated by the reference character 72, but the clamping element 70 is free beyond the region 72; and it is flexed upwardly into clamping contact with the top wall 62 by a clamping screw 75 which extends freely through a slot 76 in the top wall 62, and which threads into the clamping element 70 of the carriage 60. Pressure of the clamping element 70 against the top wall 62, and of the bottom bearing surfaces 66 against the bottom wall 63 of the channel 18, holds the carriage 60 against tilting movement with respect to the channel 18 even though the loading of the carriage 60 is a cantilever loading.

The carriage 60 can be moved into any desired location lengthwise of the channel 18, when the clamping element 70 is released; and when this element is drawn up against the top wall of the channel, the carriage is securely clamped in the selected position.

Referring again to Figure 2, a connecting plate 78 is secured to the top wall 62 by countersunk screws 80; and there is a cover 82 which fits over the connecting plate 78 and the screws 80 to give the machine a more finished appearance after all the adjustments have been made and parts have been clamped together. The channel 18 is supported at the desired level by shim blocks 84; and the channel 18 is held in place on the main frame by bolts 85 which pass through the transversely extending frame members 14 and the shim blocks 84. These bolts 85 thread into the bottom wall 66 of the channel 18.

There is a drive shaft 90 extending along the length of the channel 18, inside the channel, for operating the mechanism within all of the carriages 60. This shaft 90 is supported by an end bearing 92 (Figure 1) and it is also supported within each of the carriages 60, as will be more fully explained in connection with Figure 3. At the end of the shaft 90, beyond the bearing 92, there is a pulley 94 on the shaft driven by a belt 95 from another pulley 96 on the armature shaft of a motor 98.

Figure 3 shows the driving mechanism within each of the carriages 60. At the inner end of each spindle or driven shaft 52, there is a bevel gear 101 secured to the shaft 52 by a set screw 102. This bevel gear 101 meshes with another bevel gear 104 located on the shaft 90. This bevel gear 104 slides freely along the length of the drive shaft 90 whenever the carriage 60 is moved lengthwise of the shaft, but rotation of the drive shaft 90 is imparted to the bevel gear 104 by a key-and-keyway connection.

In the construction shown, there is a keyway 106 extending lengthwise of the shaft 90 and there is a key 108 in the hub of the bevel gear 104. It will be evident, however, that the key could be in the shaft 90 and extend throughout the full length of the shaft for cooperation with a keyway in the hub of each bevel gear 104. A splined shaft, or a shaft which is square or of other non-circular cross section, extending through a gear hub having an opening of corresponding cross section is the mechanical equivalent of the key-and-keyway connection illustrated in the drawing.

The carriage 60 has ball bearings 110 in which the shaft 90 rotates. A sleeve 112 confined between the bevel gear 104 and the right hand ball bearing 110 prevents longitudinal movement of the bevel gear 104 with respect to the carriage 60. There are cover plates 115 on the carriage 60 outside of each of the ball bearings 110.

Figure 5 shows the supporting and operating structure for the presser foot 46. This presser foot is attached to one end of a rod 120 which has a piston head 121 at its rearward end. This piston head 121 slides in a sleeve 122, and there is a bearing 124 at the forward end of the sleeve for the rod 120. A second bearing for holding the rod in horizontal alignment is provided by the piston head 121 sliding in the sleeve 122.

The piston head 121, rod 120 and presser foot 46 are urged forward by a spring 126 which is compressed between the piston head 121 and a plug 128 threaded into the rearward end of the sleeve 122. The sleeve is connected to a carriage 130 which is clamped in the guideway 18 in which the carriages 60 are clamped.

In the gang drilling machine illustrated, the physical dimensions of the carriages 60 set a minimum limit upon how close the drills 48 can be brought to one another when originally adjusting the machine. When holes are to be drilled closer together than this minimum dimension, special carriage heads having multiple chucks are attached to the front of the carriage 60 which is to provide drills for the closely spaced holes. Such a special carriage head is shown in Figure 6. Three separate chucks 133, 134 and 135 are carried by a carriage head 138 which corresponds to the carriage head 57 in Figure 2. From a center driven shaft, similar to the shaft 52 of Figure 2, the carriage head 138 has suitable gearing connections for driving the shafts which carry the chucks 133, 134 and 135.

Drill guide bushings 140 for each of the drills 48 in Figure 6 are supported from the front of the carriage head 138 by pillars 144 and a frame 146 at the outer ends of the pillars. These drill guide bushings are used where very accurate work is necessary. With wider manufacturing tolerances, the drill guide bushings are unnecessary.

The carriage head 138, and similar carriage heads having drill chucks at desired locations which are off the center of the carriage head 138, can be connected to the forward portion of the carriage 60 with the head 138 in the orientation shown, or turned at 90° about a horizontal axis. Thus with a number of different special heads 138, holes can be drilled in the work piece at any desired levels. The interior construction of the operating mechanism in the carriage head 138 is not shown because multiple chuck drilling heads are well known in the art and no illustration of the gearing for driving them is necessary for a complete understanding of this invention.

The preferred embodiment of the invention has been illustrated and described, but changes and modifications can be made and some features can be used in different combinations without departing from the invention as defined in the claims.

What is claimed is:

1. A multiple spindle drilling machine including a main frame, a work table carried by the main frame, a portion of the main frame extending longitudinally of the work table and including a track comprising a channel open along one side and including a back wall opposite the open side, a plurality of independent carriages each of which fits into the channel movable along the track, a drive shaft extending parallel to the track and enclosed within the channel, two walls on each carriage and through which the shaft extends, the walls being spaced from one another in a direction lengthwise of the shaft and confronting inside surfaces of the channel, a drill spindle carried by each of the carriages and extending from the carriage and out through the open side of the channel, driving gears for transmitting rotation of the shaft to a drill spindle carried by each carriage, the gears including a driving gear located on the shaft and driven by the shaft, said driving gear being located between the walls of the carriage and being movable along the shaft by the walls of the carriage when the carriage is adjusted one way or another lengthwise of the track, and a second gear located between the walls of the carriage and meshing with the driving gear on the shaft, the second gear being operably connected with the spindle of the carriage.

2. The multiple spindle drilling machine described in claim 1 and in which the shaft is supported by an end bearing carried by the main frame, and there are bearings in both of the walls of each carriage for providing support for the shaft within the channel and intermediate its ends and the gears are bevel gears, the thrust of which is counteracted by the bearings in the walls of the carriage.

3. The multiple spindle drilling machine described in claim 2 and in which the shaft holds the carriages against horizontal displacement toward the open side of the channel, and in which the work table is movable on the main frame in a horizontal direction toward and from the open side of the channel, and in which at least one of the independent movable carriages has a plurality of drill spindles projecting therefrom in parallel directions away from the channel.

4. The multiple spindle drilling machine described in claim 1 and in which the work table is movable on the main frame toward and from the open side of the channel.

5. A multiple spindle drilling machine including a main frame, a work table carried by the main frame, a track extending lengthwise of the main frame and comprising a channel, a plurality of independent carriages having portions that extend into the channel and that move along the channel as a track, a spindle on each carriage, means for clamping each of the carriages at any adjusted position along the track, a drive shaft extending parallel to the track and being located within the channel, a gear on the drive shaft for each carriage, the gears being driven by the drive shaft and slideable axially thereon, and another gear on each carriage located on that portion of the carriage which extends into the channel, and located in position to mesh with the gear on the drive shaft for transmitting rotation of the drive shaft to spindle driving mechanism of the carriage, the clamping means on each carriage reacting against a side of the carriage in a direction at right angles to the direction in which the spindle extends whereby the clamping force for holding the carriage in adjusted position is transverse of the direction of the spindle thrust transmitted to the carriage.

References Cited in the file of this patent

UNITED STATES PATENTS

| | | |
|---|---|---|
| 419,071 | Richards | Jan. 7, 1890 |
| 619,333 | Neville | Feb. 14, 1899 |
| 765,601 | Seymour | July 19, 1904 |
| 1,249,379 | Goldsmith | Dec. 11, 1917 |
| 1,394,709 | Buhr | Oct. 25, 1921 |
| 1,450,121 | Trumbull | Mar. 27, 1923 |

FOREIGN PATENTS

| | | |
|---|---|---|
| 511,477 | France | Sept. 24, 1920 |